United States Patent
Wallace

(10) Patent No.: US 7,418,049 B2
(45) Date of Patent: Aug. 26, 2008

(54) METHOD AND APPARATUS FOR DECODING BASEBAND ORTHOGONAL FREQUENCY DIVISION MULTIPLEX SIGNALS

(75) Inventor: Bradley Wallace, Austin, TX (US)

(73) Assignee: ViXS Systems Inc., Toronto, Ontario (CA)

( * ) Notice: Subject to any disclaimer, the term of this patent is extended or adjusted under 35 U.S.C. 154(b) by 1180 days.

(21) Appl. No.: 10/160,917

(22) Filed: Jun. 3, 2002

(65) Prior Publication Data

US 2003/0223353 A1    Dec. 4, 2003

(51) Int. Cl.
H04L 27/28    (2006.01)
H04J 11/00    (2006.01)

(52) U.S. Cl. .................. 375/261; 375/260; 370/206; 370/207

(58) Field of Classification Search ................. 375/316, 375/260, 261, 262, 332; 370/206, 207
See application file for complete search history.

(56) References Cited

U.S. PATENT DOCUMENTS

| | | | | |
|---|---|---|---|---|
| 5,802,116 A * | 9/1998 | Baker et al. ................. | 375/341 |
| 6,452,987 B1 * | 9/2002 | Larsson et al. ............. | 375/345 |
| 6,473,394 B1 * | 10/2002 | Marchok et al. ............ | 370/208 |
| 6,795,488 B1 * | 9/2004 | Iwakiri ....................... | 375/148 |
| 6,810,094 B1 * | 10/2004 | Lu .............................. | 375/341 |
| 7,065,146 B1 * | 6/2006 | Lou et al. .................... | 375/262 |
| 7,127,019 B2 * | 10/2006 | Koslov ....................... | 375/371 |
| 2001/0009569 A1 * | 7/2001 | Kang et al. ................. | 375/242 |
| 2001/0036235 A1 * | 11/2001 | Kadous ....................... | 375/341 |
| 2003/0081696 A1 * | 5/2003 | Kim et al. ................... | 375/316 |
| 2003/0123582 A1 * | 7/2003 | Kim et al. ................... | 375/347 |

OTHER PUBLICATIONS

Jim Geier, 802.11a Physical Layer Revealed, http://www.wi-fiplanet.com/tutorials/article.php/2109881.*

* cited by examiner

Primary Examiner—Betsy L Deppe

(57) ABSTRACT

A method and apparatus for decoding baseband OFDM signals include processing that begins by slicing each sub-carrier signal of the OFDM signal into a plurality of error terms. The particular number of error terms generated for each sub-carrier signal depends on the constellation size of the data being carried by each of the sub-carrier signals. The error terms for each sub-carrier signal corresponds to the nearest constellation point having a zero or one in the I or Q direction. The process continues by grouping individual error terms of the plurality of error terms for each sub-carrier signal to produce a plurality of error terms. The processing then continues by de-interleaving each of the plurality of error term groups to produce a corresponding plurality of de-interleaved error term groups. The processing then continues by interpreting the plurality of de-interleaved error term groups to produce a plurality of data values, each of the data values corresponds to data encoded within each of the sub-carrier signals.

21 Claims, 16 Drawing Sheets radio receiver 10

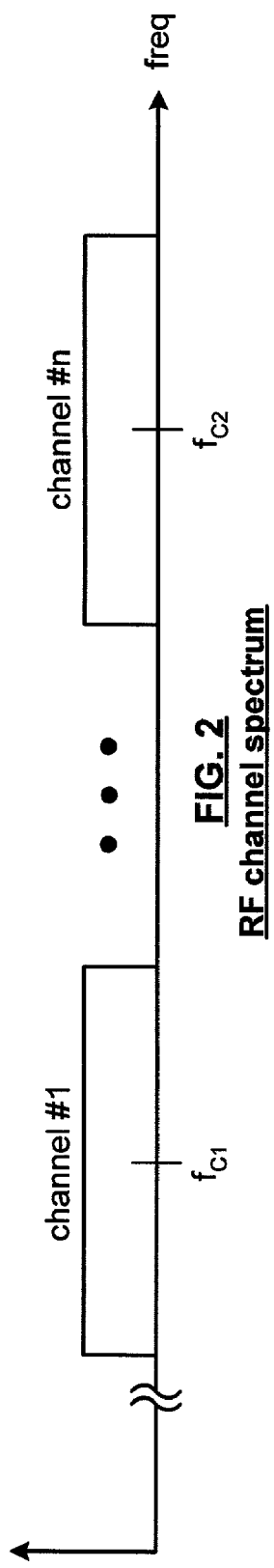
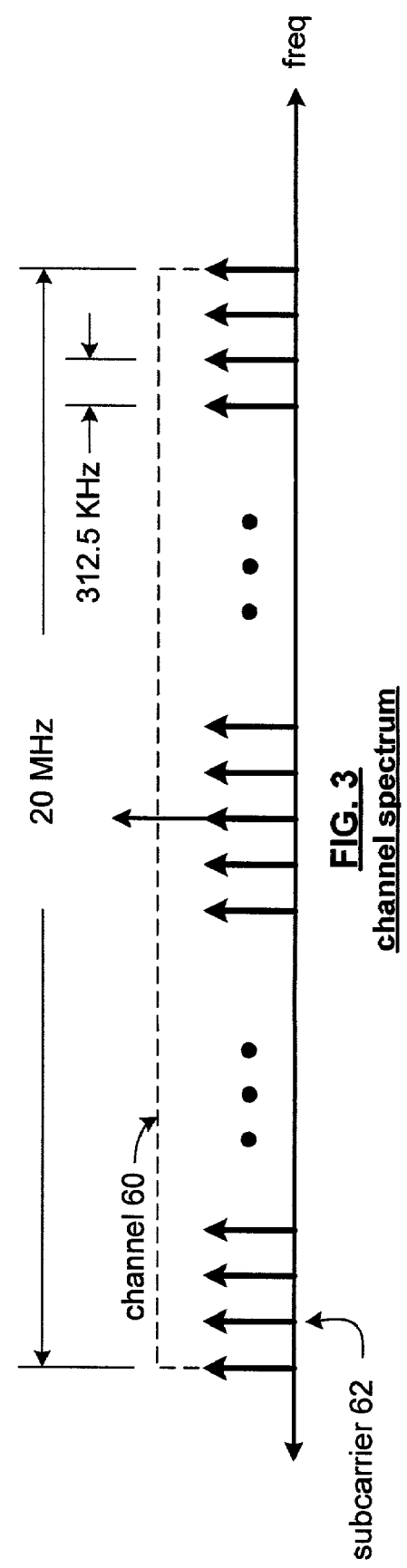

single symbol encoding single subcarrier supporting an interleaved encoded symbol transmission process for 64 QAM OFDM signal reception process for 64 QAM OFDM signal error term (e0) from recovered interleaved symbol error term (e1) from recovered interleaved symbol error term (e2) from recovered interleaved symbol error term (e3) from recovered interleaved symbol error term (e4) from recovered interleaved symbol error term (e5) from recovered interleaved symbol branch metric values from e0 and e3 (b0 and b3)

branch metric values from e2 and e5 (b2 and b5)

METHOD AND APPARATUS FOR DECODING BASEBAND ORTHOGONAL FREQUENCY DIVISION MULTIPLEX SIGNALS

BACKGROUND OF THE INVENTION

1. Technical Field of the Invention

This invention relates generally to wireless communication systems and more particularly to decoding data within such wireless communication systems.

2. Description of Related Art

Wireless communication systems are known to include a plurality of wireless communication devices that communicate over wireless communication channels, which are supported by wireless communication infrastructure equipment (e.g., base stations, access points, system controllers, wide area network interfaces, local area network interfaces, et cetera). Each wireless communication device, which may be a radio, cellular telephone, station coupled to a personal digital assistant, personal computer, laptop, et cetera, includes a radio transmitter and a radio receiver. The radio transmitter includes a baseband processor, one or more intermediate frequency stages, filters, and a power amplifier coupled to an antenna. The baseband processor encodes and/or modulates, in accordance with a wireless communication standard such as IEEE 802.11a, IEEE802.1b, Bluetooth, Global System for Mobile communications (GSM), Advanced Mobile Phone Service (AMPS), et cetera, to produce baseband signals. The one or more intermediate frequency stages mix the baseband signals with one or more local oscillations to produce a radio frequency signal. The filter filters the radio frequency signal to remove unwanted frequency components and the power amplifier amplifies the filtered radio frequency signal prior to transmission via the antenna.

A radio receiver is known to include a low noise amplifier, one or more intermediate frequency stages, filters and a receiver baseband processor. The low noise amplifier amplifies radio frequency (RF) signals received via an antenna and provides the amplified RF signals to the one or more intermediate frequency stages. The one or more intermediate frequency stages mixes the amplified RF signal with one or more local oscillations to produce a receive baseband signal. The receiver baseband processor, in accordance with a particular wireless communication standard, decodes and/or demodulates the baseband signals to recapture data therefrom.

An IEEE 802.11a compliant receiver baseband processor includes analog to digital converters (ADC), fast-fourier-transform module (FFT), frequency equalization module (FEQ), a slicing module, a de-interleaving module and a decoder. The analog to digital converters receive an analog representation of the baseband signal, which for an IEEE 802.11a compliant system includes 64 sub-carriers each of which is an individual sinusoid having a unique amplitude and phase offset to represent encoded data, and converts the analog baseband signals into digital baseband signals. The resulting digital baseband signals include 64 time domain digital signals, each of which is a digital signal representing a particular amplitude and a particular phase of the corresponding analog sub-carriers. The FFT module converts the time domain digital baseband signals into frequency domain baseband signals. For an IEEE802.11a compliant system, the fast-fourier-transform module converts each of the 64 time domain sinusoidal waveforms into 64 bins of I and Q components. The frequency equalization module is programmed to filter the noise injected by the radio frequency channel into the received RF signal.

The slicing module, which may be a soft slicing module or a hard slicing module, generates symbol estimation information for each bin of I and Q components. The de-interleaving module de-interleaves the symbol estimation information, which is subsequently routed to the decoder. The decoder converts the de-interleaved symbol estimation information into branch metrics and recaptures the encoded data from the branch metrics.

In such a receiver baseband processor, the slicing module is a critical component not only from an accuracy standpoint (e.g., errors in the estimation information produces errors in the resulting data), but also from an efficiency standpoint. As is known, a hard slicing module generates error values based on Hamming distance, which indicates the number of bits that are different between the estimated symbol (i.e., the received I and Q values) and the ideal symbols (i.e., the I and Q values for each constellation point of a binary phase shift keying (BPSK) system, quadrature phase shift keying (QPSK) system, 16 QAM (quadrature amplitude modulation) system, or a 64 QAM system). Accordingly, the hard slicing module generates 4 error values for QPSK, 16 error values for 16 QAM, and 64 error values for 64 QAM modulation schemes. The decoder produces the branch metrics from the error terms using an exclusive OR function that is an increasingly iterative process as the number of error values increase.

A soft slicing module generates error terms based on a Euclidean distance, which is a physical measure of the error between the actual symbol value and each ideal symbol value. Like the hard slicing module, the soft slicing module generates 4 error terms for QPSK, 16 error terms for 16 QAM and 64 error terms for 64 QAM. As such, even though a soft slicing module generally provides a 3 dB signal-to-noise ratio improvement over a hard slicing module, it requires a significant amount of processing resources to produce the error values.

Therefore, a need exists for a method and apparatus that provides accurate and efficient baseband processing, especially slicing, within a radio receiver.

BRIEF DESCRIPTION OF THE SEVERAL VIEWS OF THE DRAWINGS

FIG. 2 is a frequency domain representation of a radio frequency channel spectrum in accordance with the present invention;

FIG. 3 is a frequency domain representation of a channel in accordance with the present invention;

DETAILED DESCRIPTION OF THE INVENTION

Generally, the present invention provides a method and apparatus for decoding baseband orthogonal frequency division multiplex (OFDM) signals. Such a method and apparatus include processing that begins by slicing each sub-carrier signal of the OFDM signal into a plurality of error terms. The particular number of error terms generated for each sub-carrier signal depends on the constellation size of the data being carried by each of the sub-carrier signals. The error terms for each sub-carrier signal corresponds to the nearest constellation point having a zero or one in the I or Q direction. By generating the error terms in this manner, a significantly less number of error terms are needed for 16 QAM and 64 QAM modulation schemes to accurately recapture the data.

The process continues by grouping individual error terms of the plurality of error terms for each sub-carrier signal to produce a plurality of error terms. As such, the error terms associated with a particular sub-carrier are grouped into the error term groups. The processing then continues by de-interleaving each of the plurality of error term groups to produce a corresponding plurality of de-interleaved error term groups. The processing then continues by interpreting the plurality of de-interleaved error term groups to produce a plurality of data values, each of the data values corresponds to data encoded within each of the sub-carrier signals. With such a method and apparatus, substantially less error terms are generated to accurately recapture encoded data. As such, the processing resources and complexity of the slicing circuitry is reduced thereby improving efficiency and reducing the cost of integrated circuits containing such radio receivers.

Figure 1:
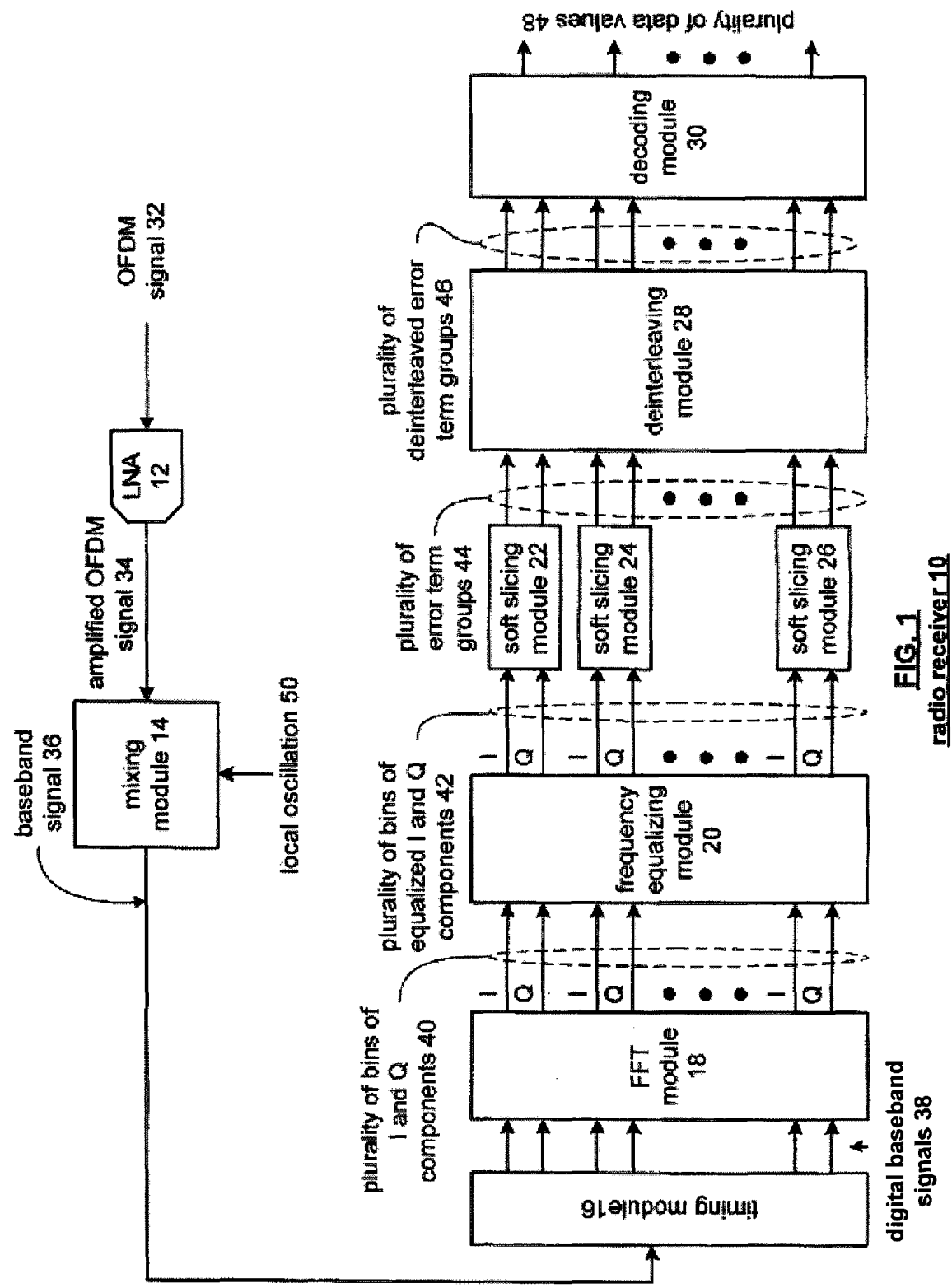
FIG. 1 is a schematic block diagram illustrating a radio receiver in accordance with the present invention.

The present invention can be more fully described with reference to FIGS. 1-18. FIG. 1 illustrates a schematic block diagram of a radio receiver 10 that includes a low noise amplifier 12, mixing module 14 and a baseband processor 15. The baseband processor 15 includes a timing module 16, fast-fourier-transform (FFT) module 18, frequency equalizing (FEQ) module 20, a plurality of soft slicing modules 22-26, a de-interleaving module 28, and a decoding module 30. Each of these components may be implemented as discrete integrated circuits, all within one integrated circuit or any combination thereof.

In operation, the low noise amplifier 12 receives an orthogonal frequency division multiplex (OFDM) signal 32. The OFDM signal 32 corresponds to a channel of data within an RF channel spectrum. With reference to FIGS. 2 and 3, an RF channel spectrum for an IEEE802.11a compliant system includes a plurality of channels (channel No. 1 through channel No. N). Each of these channels is centered at a carrier frequency that may be in the range of 5.15-5.35 gigahertz and 5.725-5.825 gigahertz. FIG. 3 illustrates the frequency components of a single channel of the plurality of channels shown in FIG. 2. As shown, the channel 60 is approximately 20 megahertz wide and includes a plurality of sub-carrier 62 (e.g., 64 sub-carriers). Each sub-carrier is a unique sinusoidal signal having a particular amplitude and phase offset that represents encoded data. Each of the sub-carriers is spaced by approximately 312.5 kilohertz.

Returning to the discussion of FIG. 1, the low noise amplifier 12 amplifies the OFDM signal 32, which may be as described with referenced to FIGS. 2 and 3, to produce an amplified OFDM signal 34. The mixing module 14 mixes the OFDM signal 34 with a local oscillation 50 to produce a baseband signal 36. The mixing module may include one or more intermediate frequency stages wherein the local oscillation 50 corresponds to an intermediate frequency or the RF frequency. The resulting baseband signal 36 is a composite of sine waves, where each sine wave corresponds to a sub-carrier 62 of the OFDM signal 34.

The timing module 16 receives the baseband signal 36 and converts it into a plurality of digital baseband signals 38. In essence, the timing module 16 converts the baseband sine waves into time domain digital I and Q components, which correspond to magnitudes and phases of the corresponding sine waves. The result is a digital baseband signal that includes a digital time domain I and Q component for each subcarrier.

The FFT module 18 receives the digital baseband signals 38 and converts the time domain I and Q components of each sub-carrier into frequency domain I and Q components. The resultant is a plurality of bins of I and Q components 40. Each bin corresponds to the frequency domain representation of a sub-carrier of the OFDM channel. For an IEEE 802.11a compliant system, the FFT module 18 outputs 64 bins of I and Q components, each bin corresponding to one of the 64 sub-carriers of the OFDM channel.

The frequency equalizing (FEQ) module 20 receives the plurality of bins of I and Q components and filters them to produce a plurality of bins of equalized I and Q components 42. In general, the frequency equalization module 20 has a transfer function that corresponds to the inverse of the RF channel on which the OFDM signal 32 was received. As such, the frequency equalizing module 20 is effectively removing the adverse effects caused by the RF channel. For a more detailed discussion of a frequency equalizing module 20 refer to co-pending patent application, which is assigned to the same assignee as the present patent application, and is entitled DIGITAL DEMODULATION UTILIZING FREQUENCY EQUALIZATION, having a filing date of Apr. 15, 2002, and a U.S. Ser. No. of 10/122,784, now U.S. Pat. No. 7,085,315, issued Aug. 1, 2006.

Each of the plurality of soft slicing modules 20-26, which will be described in greater detail with reference to FIGS. 7-18, receives a corresponding bin of equalized I and Q components 42. For example, soft slicing module 22 receives the I and Q components 42 stored in bin zero, soft slicing module 24 receives the I and Q components 42 of bin 1, and soft slicing module 26 receives the I and Q components 42 of bin 63. Each soft slicing module 22-26 produces a group of error terms 44 based on the corresponding equalized I and Q components 42. The group of error terms produced by each soft slicing module 22 includes a specific number of error terms that corresponds to the constellation mapping used to encode the data on each of the sub-carrier 62 of the OFDM signal 32. For instance, if the data was encoded using QPSK, each soft slicing module 22 would produce two error terms; for 16 QAM, each soft slicing module would produce four error terms and, for 64 QAM, each soft slicing module 22-26 would produce six error terms. In contrast with prior art hard slicing modules and/or prior art soft slicing modules, the number of error terms produced by the present soft slicing modules is significantly less. As such, the processing to interpret the error terms is less thereby improving the overall efficiency of the radio receiver 10.

The de-interleaving module 28 receives the plurality of error term groups 44 and de-interleaves them to produce a plurality of de-interleaved error term groups 46. The manner in which the error terms are de-interleaved is based on the manner in which the symbols of the OFDM signal 32 were interleaved. This will be described in greater detail with reference to FIGS. 4-7.

The decoding module 30 receives the plurality of de-interleaved error term groups 46 and generates therefrom branch metrics. From the branch metrics, the decoding module 30 produces a plurality of data values 48. Each data value 48 corresponds to the data encoded within a particular sub-carrier. As such, for IEEE 802.11a, there will be up to 64 data values produced, one corresponding to each of the sub-carriers. The type of decoding performed by decoding module 30 may be one-half rate VITERBI decoding. In addition, the decoding module 30 may include a depuncture process to remove the puncturing (i.e., compression) of the data performed within the transmitter that transmitted the OFDM signal 32.

Figure 4:
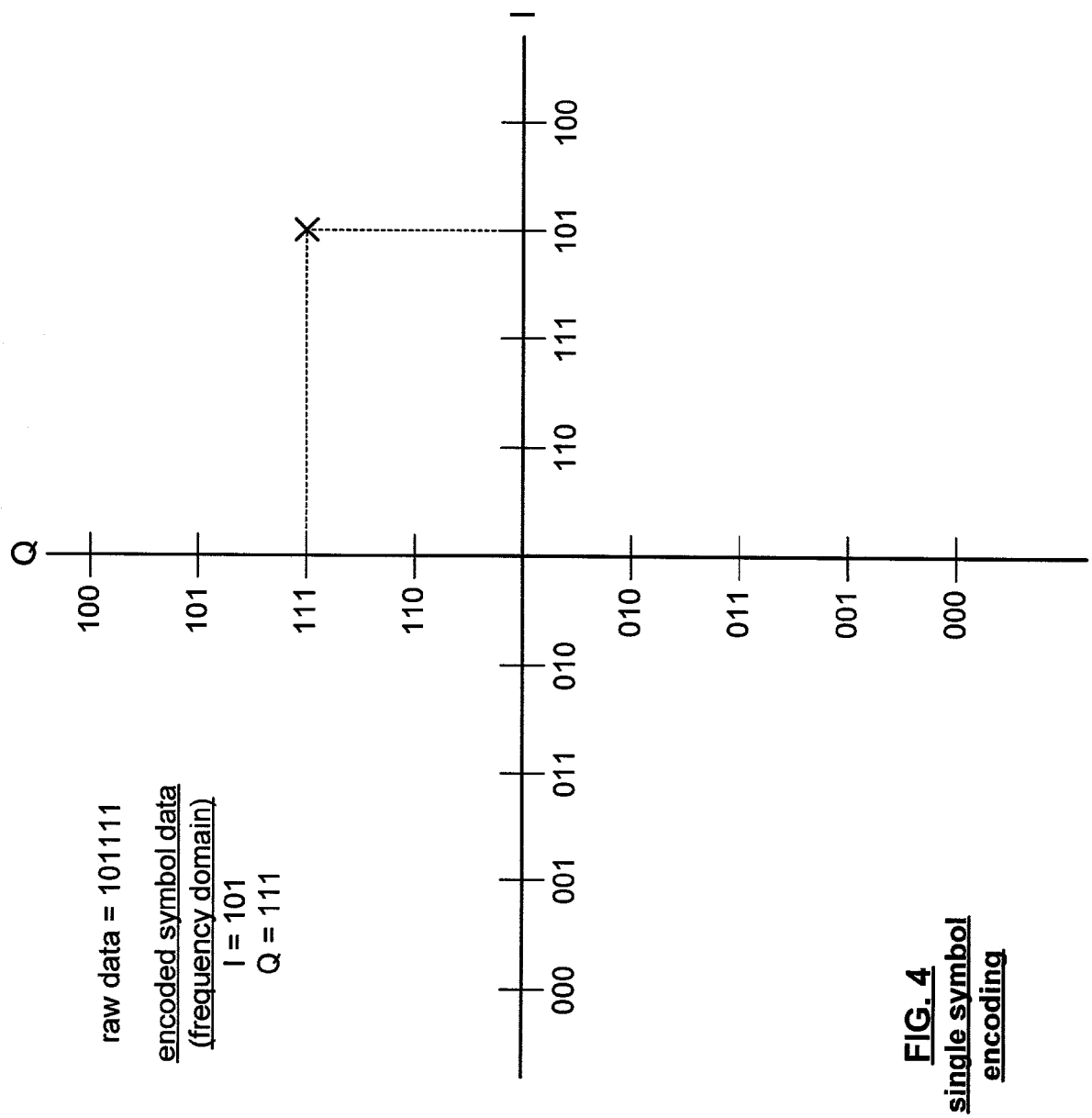
FIG. 4 is an example of mapping raw data to a constellation point in accordance with the present invention.

FIG. 4 is a graphical representation illustrating 64 QAM symbol encoding of raw data. In this example, the raw data is a 6-bit value of 101 111. The encoded symbol data, in the frequency domain has an I component of 101 and a Q component of 111. Thus, mapping this particular raw data to the 64 QAM constellation map places the symbol at the X as shown. This encoding is done for 48 of the 64 sub-carriers that support data. As such, with the encoding process in the transmitter, 48 sets of raw data are encoded to produce 48 symbols that eventually comprise the OFDM signal 32.

Figure 5:
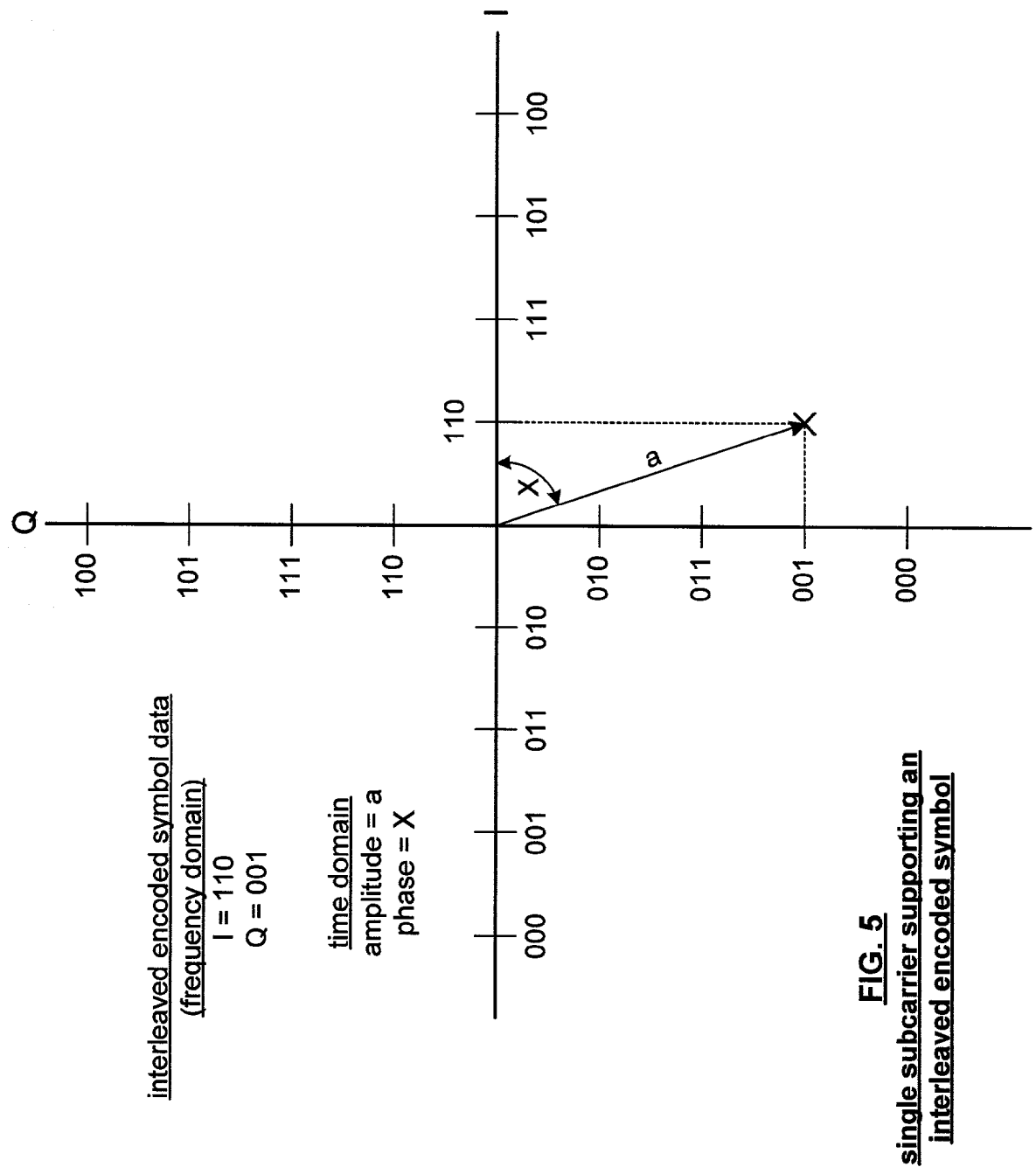
FIG. 5 is a time domain representation of an example of converting an interleaved encoded symbol data from the frequency domain to the time domain in accordance with the present invention.

FIG. 5 illustrates a graphical representation of a single sub-carrier supporting an interleaved encoded symbol. In this example, the frequency domain representation of an interleaved encoded symbol has an I component of 110 and a Q component of 001. Such a symbol maps to the X position as shown in FIG. 5. The time domain representation of this interleaved encoded symbol has an amplitude "a" and a phase X. The interleaved encoded symbol as well as the use of the time domain representation thereof will be described in greater detail with reference to FIGS. 6 and 7.

Figure 6:
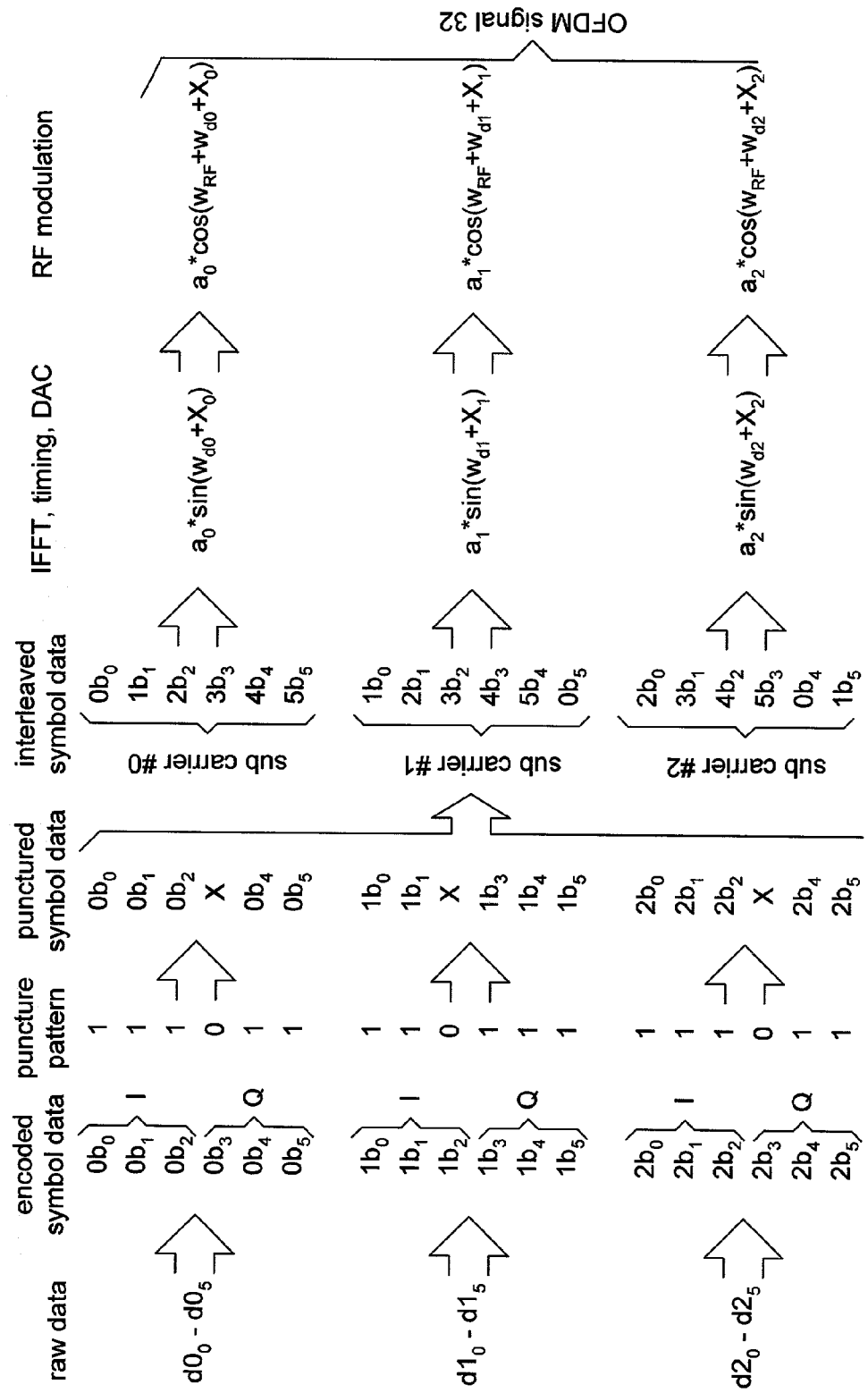
FIG. 6 is a graphical representation of a transmission process for a 64 QAM OFDM signal in accordance with the present invention.

FIG. 6 illustrates a graphical representation of the transmission process for a 64 QAM OFDM signal. The processing of raw data proceeds from the left of the figure to the right of the figure. Accordingly, there are 48 sets of raw data that are to be encoded to produce encoded symbol data. Of the 48, the 1st three are illustrated in FIG. 6. As shown, the 1st set of bits of raw data ($d0_0$-$d0_5$) is encoded into a particular symbol. The encoded symbol includes three bits for an I component ($0b_0$-$0b_2$) and three bits for a Q component ($0b_3$-$0b_5$).

The $2^{nd}$ set of bits of raw data (e.g., $d1_0$-$d1_5$) is converted into an encoded symbol. The corresponding encoded symbol includes three bits of an I component ($1b_0$-$1b_2$) and three bits for a Q component (e.g., $1b_3$-$1b_5$). The $3^{rd}$ set of bits of raw data (e.g., $d2_0$-$d2_5$) is converted into an encoded symbol having three bits for an I component (e.g., $2b_0$-$2b_2$) and three bits for a Q component (e.g., $2b_3$-$2b_5$).

The next column corresponds to a puncture pattern, which compresses the data of the encoded symbols. The puncture pattern includes primarily 1's and an occasional 0. The positioning of the 0's may be in accordance with the puncture pattern prescribed in the IEEE 802.11a standard. As such, once the encoded symbol data is punctured, wherever the puncture pattern included a 0, the punctured symbol is deleted. In this example, the $4^{th}$ bit of the $1^{st}$ encoded data symbol is deleted, the $3^{rd}$ bit of the $2^{nd}$ encoded data symbol is deleted, and the $4^{th}$ bit of the $3^{rd}$ encoded data symbol is deleted.

The punctured symbol data is then interleaved onto various sub-carriers. The interleaving pattern may be in accordance with the IEEE802.11 standard or a proprietary interleaving scheme. The interleaving shown in FIG. 5 is presented to provide an example of how the interleaving functions. As shown, each sub-carrier includes bits of the punctured symbol data from various encoded symbols. For example, sub-carrier 0 may include bit 0 of the $1^{st}$ punctured symbol, bit 1 from the $2^{nd}$ punctured symbol, bit 2 from the $3^{dr}$ punctured symbol (e.g., $2b_2$), bit 3 from the $4^{th}$ punctured symbol (e.g., $3B_3$), et cetera. Each sub-carrier will have an interleaved pattern of bits from various punctured symbols. By interleaving the data in this manner, the ability to accurately recapture data by receiver is enhanced since, even if one or more of the sub-carriers have a significant amount of interference, others will not. For example, if an encoded symbol were fully placed on one sub-carrier, and that sub-carrier had a significant amount of interference, the symbol would be distorted beyond the receiver's ability to accurately recapture the raw data. However, by having bits of each of the symbols in various sub-carriers, if one sub-carrier has a substantial amount of interference, a majority of the encoded symbol data is still accurately received by the receiver via the sub-carriers with less interference. Accordingly, the sub-carriers that have a higher signal-to-noise ratio may have a weighting factor that is greater than other sub-carriers with a lower signal-to-noise ratio. This, as will be explained later, further enhances the receiver's ability to accurately decode the data.

The next column within the transmission process corresponds to an inverse fast-fourier-transform (IFFT) and timing and DAC (Digital to Analog Conversion). The inverse fast-fourier-transform converts the frequency domain interleaved symbol data to the time domain. This was graphically illustrated in FIG. 5. The time and DAC function takes the amplitude and phase shift corresponding to the frequency domain representation of the interleave symbol and produces a corresponding sine wave. As shown, for sub-carrier 0, the sine wave has an amplitude of $a_0$ and a frequency offset of $X_0$. The $w_{d0}$ corresponds to the individual frequency of the data, i.e., the frequency of the sub-carrier. As previously mentioned with reference to FIG. 3, each sub-carrier is separated from the others by 312.5 kilohertz. As such, $w_{d1}$ equals $w_{d0}$ plus 312.5 KHz, $w_{d2}$ equals $w_{d1}$ plus 312.5 KHz, etc.

The IFFT function and timing/ADC function produce a sine wave for the $1^{st}$ subcarrier, the $2^{nd}$ sub-carrier and all remaining sub-carriers of the 64 within a particular channel.

The RF modulation function mixes the sinusoid waveforms of the sixty-four sub-carrier, which are at baseband, with a radio frequency (RF) carrier frequency. The resulting signals are cosine waveforms having the same amplitude and frequency offset as their corresponding baseband sine waveforms, but at a much higher frequency rate. The 64 modulated sub-carriers comprise the OFDM signal 32.

Figure 7:
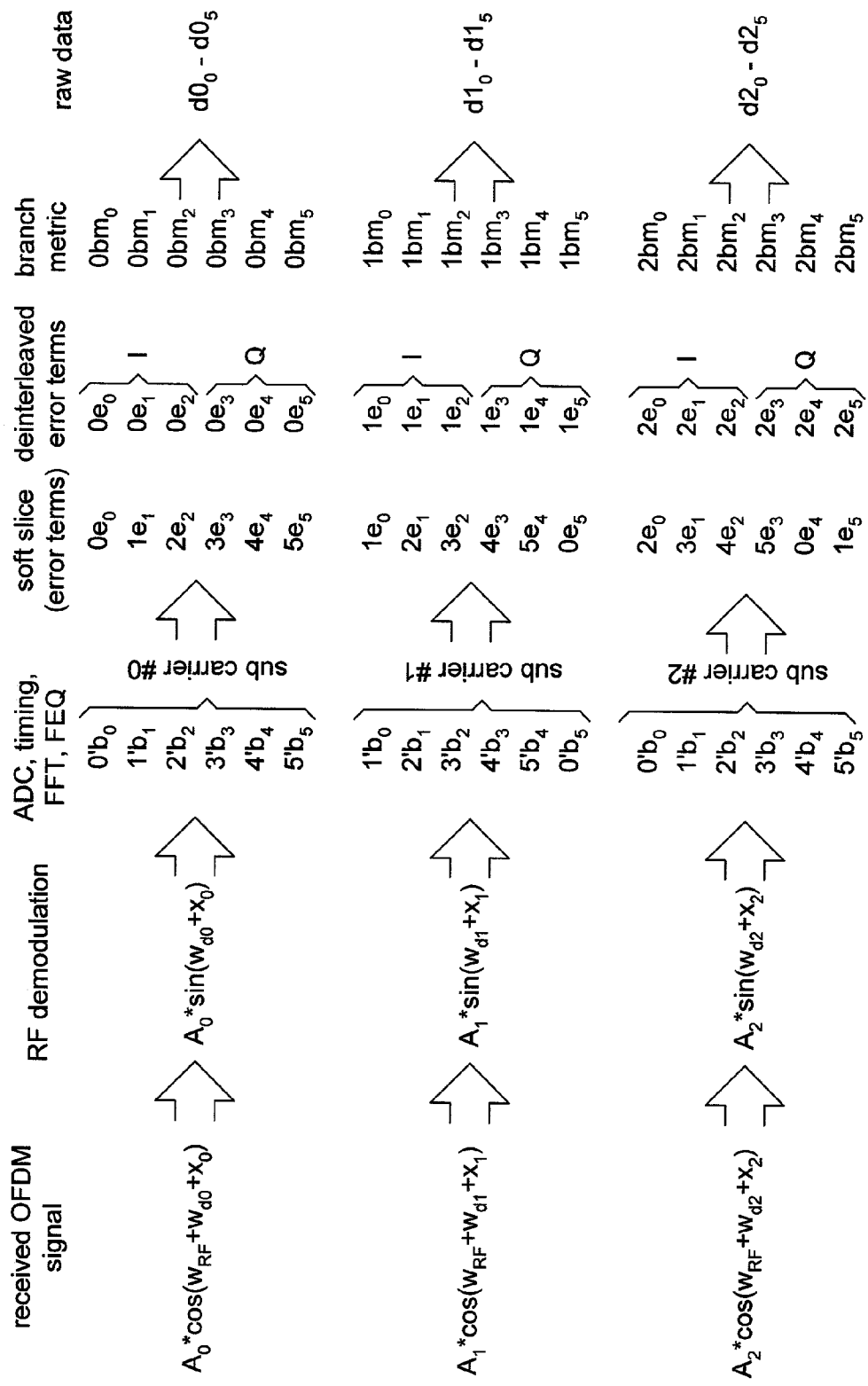
FIG. 7 is a graphical representation of the receiving process for a 64 QAM OFDM signal in accordance with the present invention.

FIG. 7 illustrates a graphical representation of the receiving process of a 64 QAM OFDM signal. As shown, the received OFDM signal includes a plurality of cosine waveforms, each having a corresponding amplitude (e.g., $A_0$, $A_1$, $A_2$, etc.) and a corresponding phase offset (e.g., $x_0$, $x_1$, $x_2$, etc.). The amplitude and frequency offset for each of the cosine waveforms are not identical to the corresponding amplitudes and phase offsets transmitted, which was illustrated in FIG. 6. The difference between the amplitudes and phases is based on the gain and frequency response of the channel carrying the OFDM signal.

The next column corresponds to the RF demodulation process. The RF demodulation process mixes the cosine wave forms of the received OFDM signal with a local oscillation to produce baseband sine waveforms having the corresponding amplitude and phase offset.

The timing and ADC, FFT, and frequency equalization (FEQ) functions produce an estimated frequency domain representation of the data embedded within each of the sinusoidal signals. As illustrated in FIG. 5, the amplitude and phase of a signal can be mapped to a particular constellation point. As such, the decompilation, FFT and FEQ process produces a 6-bit representation of the interleave symbol that was transmitted on the sub-carrier number 0. Similarly, a recaptured interleave symbol is produced for each of the remaining sub-carriers.

The soft slicing modules receive the estimated interleave symbol from the decompilation, FFT and FEQ process and produce 6 error terms (for 64 QAM). Each soft slicing process produces 6 corresponding error terms, each error term corresponding to the particular bit location within the interleave symbol. For example, as shown, the $1^{st}$ soft slicing function produces 6 error terms $0e_0, 1e_1, 2e_2, 3e_3, 4e_4, 5e_5$. The $2^{nd}$ soft slicing process and the $3^{rd}$ soft slicing process produces the error terms as shown. As will be discussed in greater detail with reference to FIGS. 8-13, the soft slicing process produces only 6 error terms for a 64 QAM function as opposed to 64 error terms as produced in prior art soft slicing modules and/or prior art hard slicing modules. The benefits of reduced number of error terms should be readily apparent to one of average skill in the art and include, but are not limited to, reduced processing complexity, improved speed of processing, while maintaining accuracy of data recovery.

The error terms are de-interleaved to produce de-interleaved error terms. As shown, the $1^{st}$ set of error terms $0e_0$-$0e_5$ form a deinterleaved group of error terms having a corresponding I component and Q component. As will be discussed with reference to FIGS. 13-16, the de-interleaved error terms are converted to branch metrics, which are subsequently processed to recapture the raw data.

Note that the error terms produced by the soft slicing module may have associated weighting factors, which are based on the signal strength of the corresponding sub-carrier. As such, when the de-interleaved error terms are processed to produce the branch metrics, the error terms having a larger weighting factor are given preferential treatment with respect to error terms having a lower weighting factor. This allows for greater accuracy in recapturing the data, since the error terms received via sub-carriers having greater signal-to-noise ratio are known to more accurately represent the actual data than information contained on sub-carrier channels having a smaller signal-to-noise ratio.

FIGS. 8-13 illustrate the generation of error terms from a recovered interleaved symbol for a 64 QAM process by the plurality of slicing modules. If the encoding process utilizes 16 QAM, only 4 error terms would be generated (e.g., $e_0$-$e_3$) and if QPSK modulation were to be used, only 2 error terms would be generated (e.g., $e_0$ and $e_1$). The examples of FIGS. 8-13 are based on a recovered interleaved symbol having a bit value of 101 111.

Figure 8:
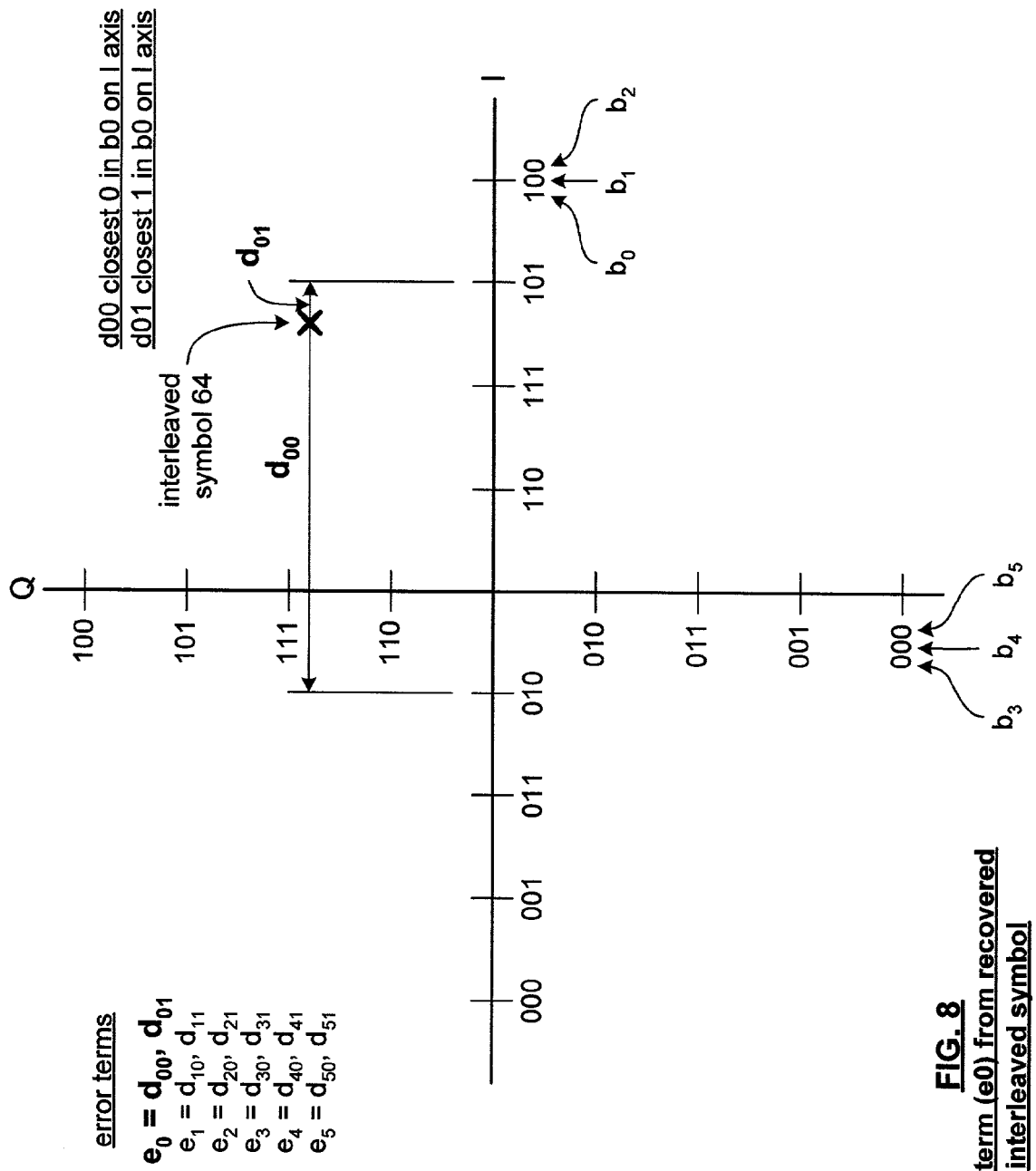
FIGS. 8-13 are graphical representations of determining error signals from recovered interleaved symbols in accordance with the present invention.

As shown in FIG. 8, the determination of error term ($e_0$) is derived based on the actual mapping of the interleave symbol 64. The $1^{st}$ error term $e_0$, includes two components (e.g., $d_{00}$ and $d_{01}$). $D_{00}$ corresponds to the closest 0 in bit position $b_0$ along the I axis and $d_{01}$ corresponds to the closest 1 in bit position $b_0$ on the I axis. In this example, $d_{00}$ is a physical distance that represents the distance from the interleave symbol 64 to 010 along the I axis. Similarly, $d_{01}$ corresponds to the physical distance from the interleave symbol 64 to 101 along the I axis. The accuracy of the distance is based on the number of bits contained within the $d_{00}$ and $d_{01}$ values. The more bits used to represent the distance, the greater the accuracy in the measurement. Note that this interleave symbol 101 111 corresponds to one recovered interleaved symbol of the plurality of recovered interleaved symbols. As such, this process is repeated 64 times, once for each recovered interleaved symbol from the corresponding sub-carriers.

Figure 9:
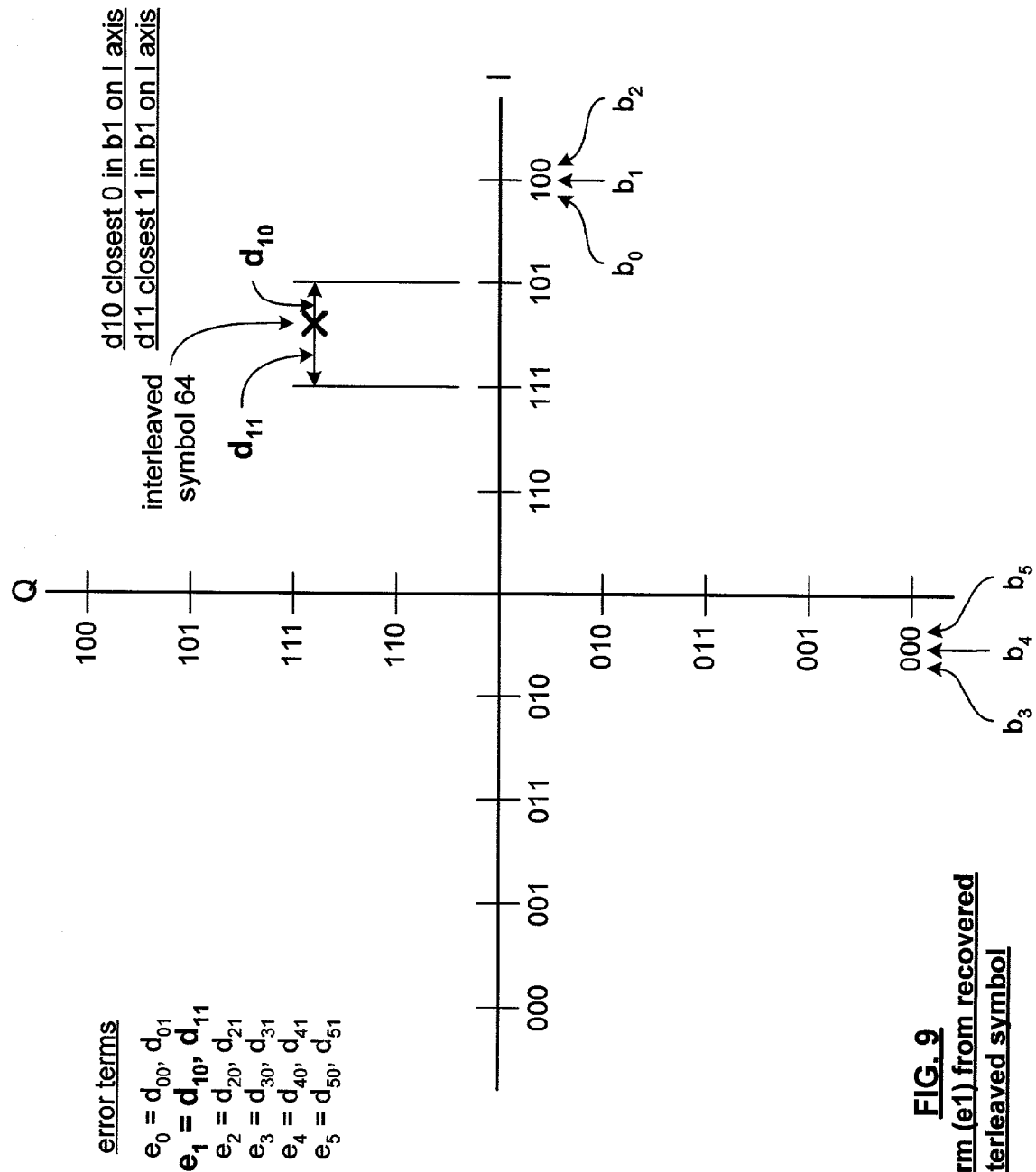

FIG. 9 illustrates a graphical representation of determining the $2^{nd}$ error term ($e_1$), which includes two terms $d_{10}$ and $d_{11}$. $d_{10}$ corresponds to the closest 0 in bit position $b_1$ on the I axis. $d_{11}$ corresponds to the closest 1 in bit position $b_1$ on the I axis. As shown, $d_{11}$ is the physical distance between the interleave symbol 64 and the ideal location along the I axis of 111. Similarly, $d_{10}$ corresponds to the distance between interleave symbol 64 and 101 along the I axis.

Figure 10:
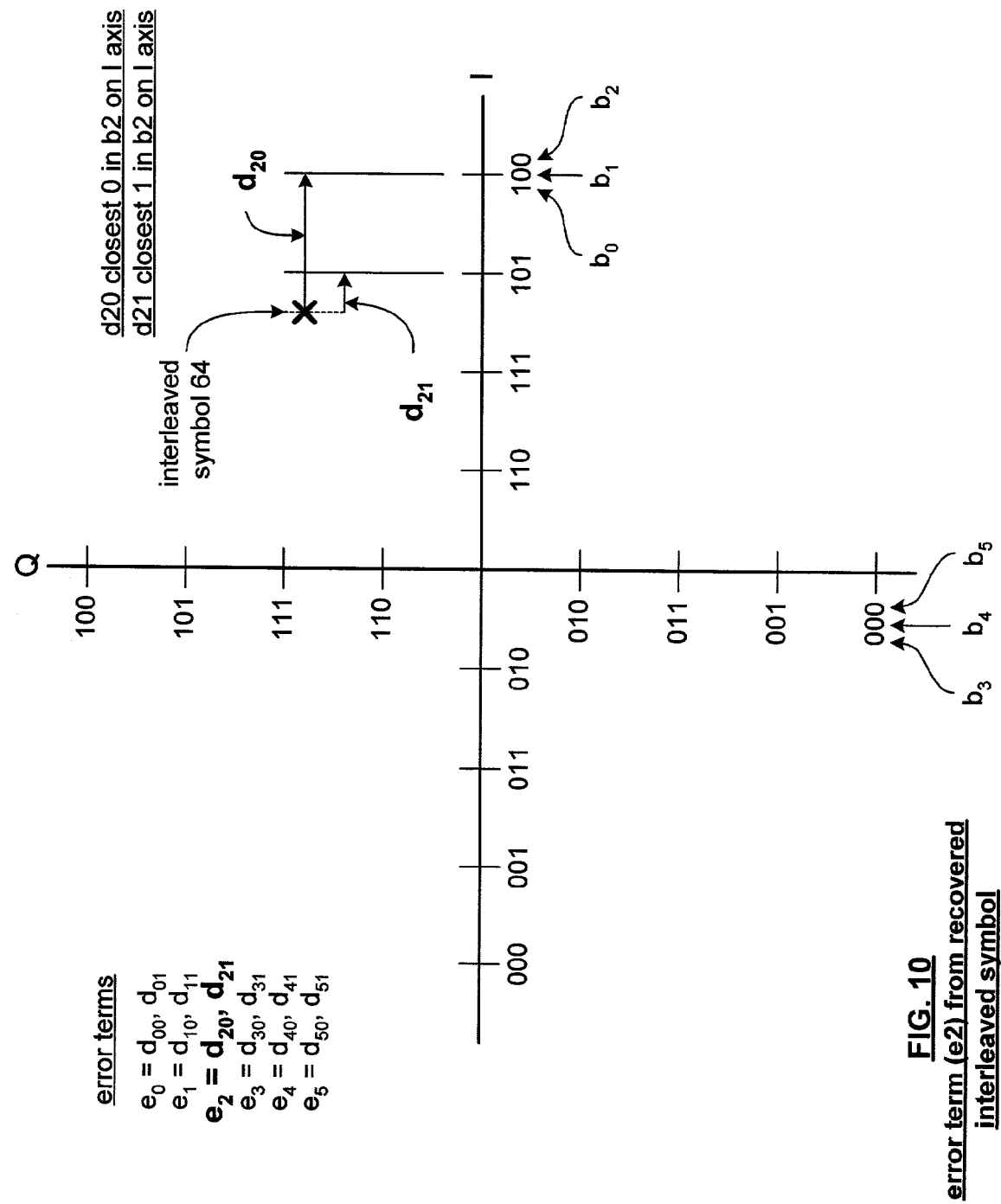

FIG. 10 illustrates the graphical representation of determining error term ($e_2$). Error term $e_2$ includes two values $d_{20}$ and $d_{21}$. $d_{20}$ corresponds to the closest 0 in bit position $b_2$ on the I axis and $d_{21}$ corresponds to the closest 1 in bit position $b_2$ on the I axis. In this example, the value $d_{20}$ corresponds to the physical distance between the interleave symbol 64 and the location 100 along the I axis. $d_{21}$ corresponds to the physical distance between the interleave symbol 64 and the location 101 along the I axis.

Figure 11:
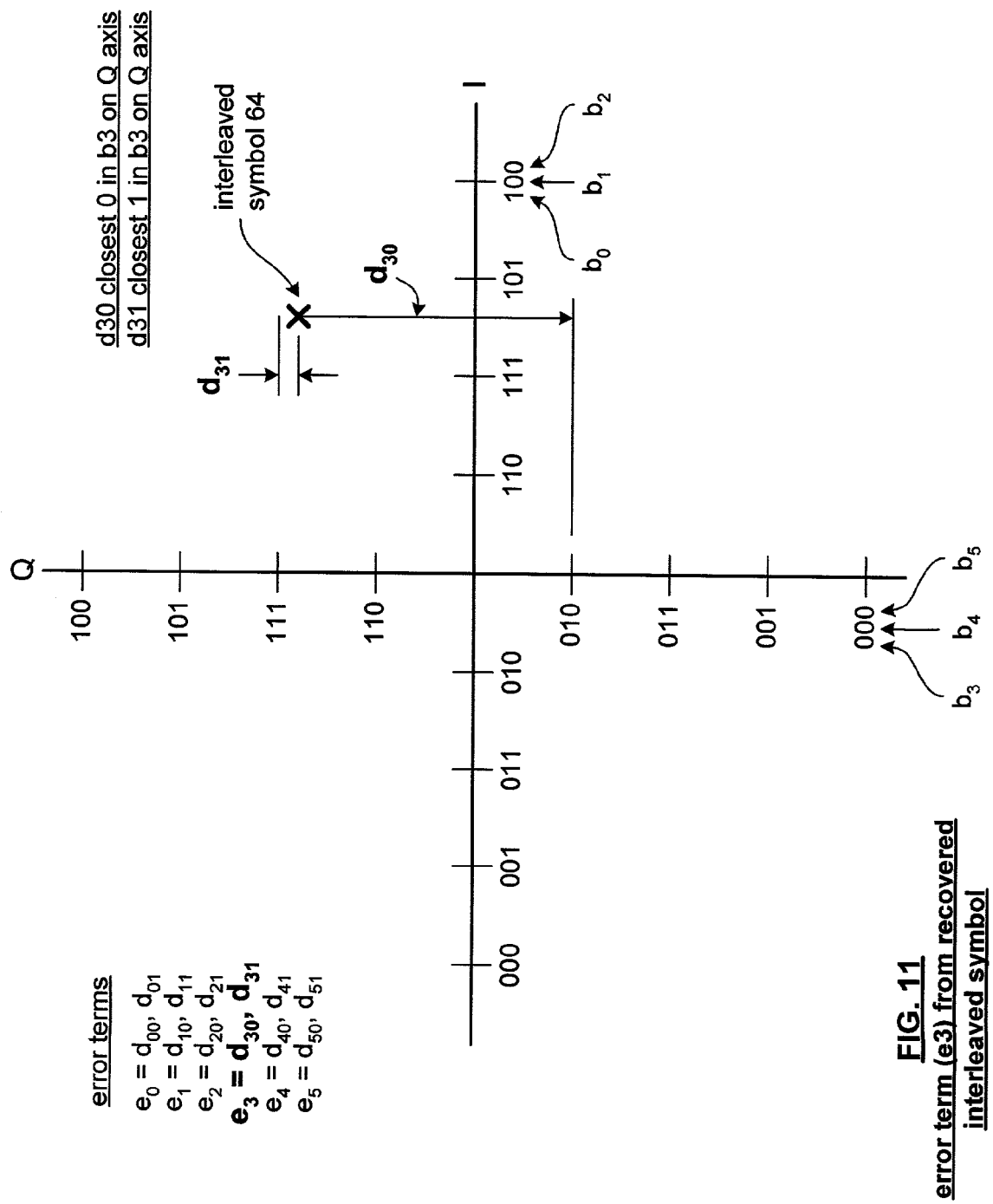

FIG. 11 illustrates the determination of error term $e_3$ for this recovered interleave symbol. Error term $e_3$ includes 2 values $d_{30}$ and $d_{31}$. $d_{30}$ corresponds to the closest 0 in bit position $b_3$ on the Q axis and $d_{31}$ corresponds to the closest 1 in bit position $b_3$ on the Q axis. As shown, $d_{31}$ represents the physical distance between the interleave symbol 64 and position 111 along the Q axis. $d_{30}$ corresponds to the physical distance between the interleave symbol 64 and 101 on the Q axis.

Figure 12:
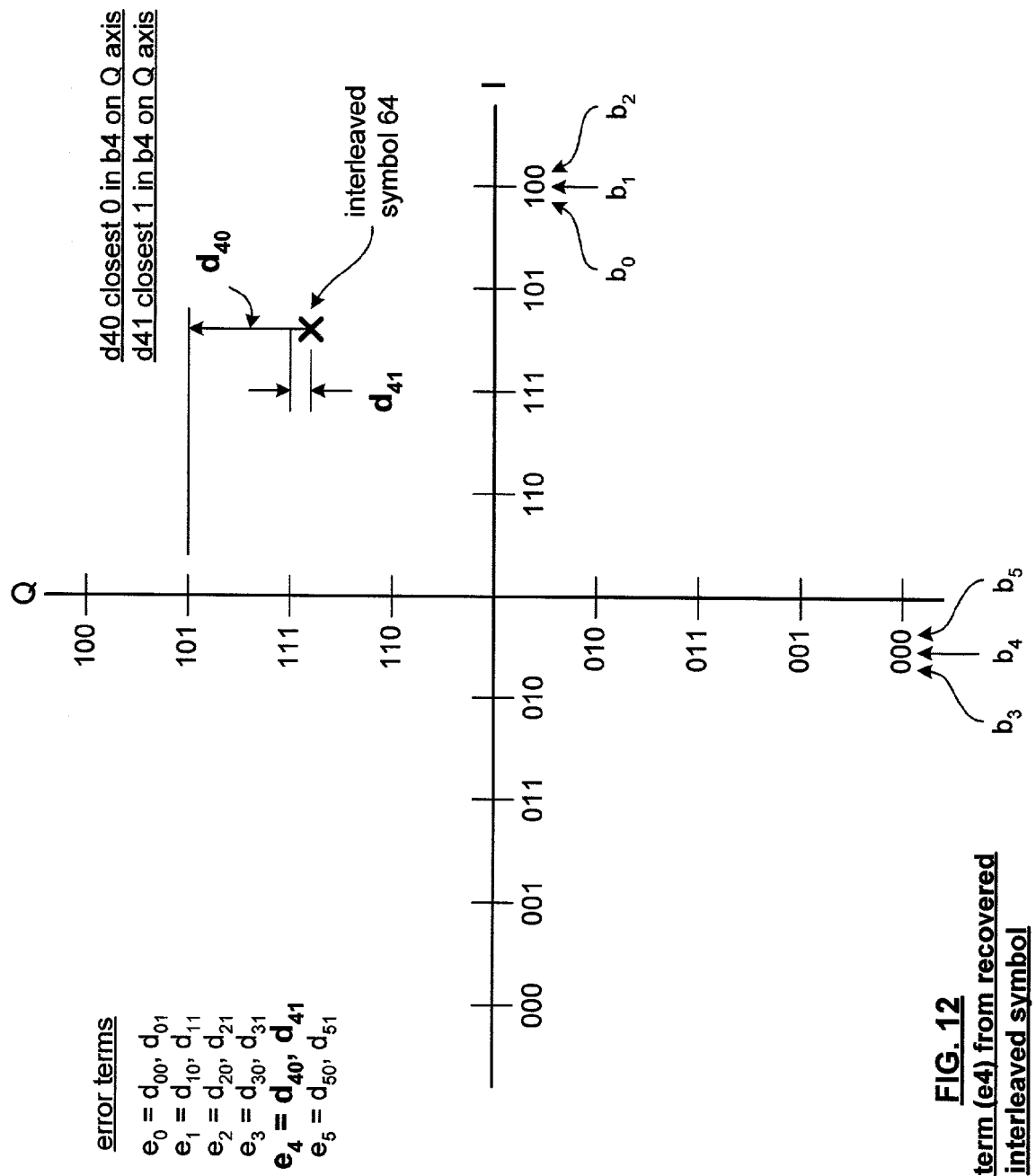

FIG. 12 illustrates a graphical representation of determining error term $e_4$ from the recovered interleave symbol. In this example, $e_4$ includes 2 values $d_{40}$ and $d_{41}$. $d_{40}$ corresponds to the closest 0 in bit position $b_4$ along the Q axis. $d_{41}$ corresponds to the closest 1 in the bit position $b_4$ along the Q axis. As shown, $d_{40}$ is the physical distance between the interleave symbol 64 and the 101 position along the Q axis. $d_{41}$ corresponds to the physical distance between the interleave symbol 64 and the position 111 along the Q axis.

Figure 13:
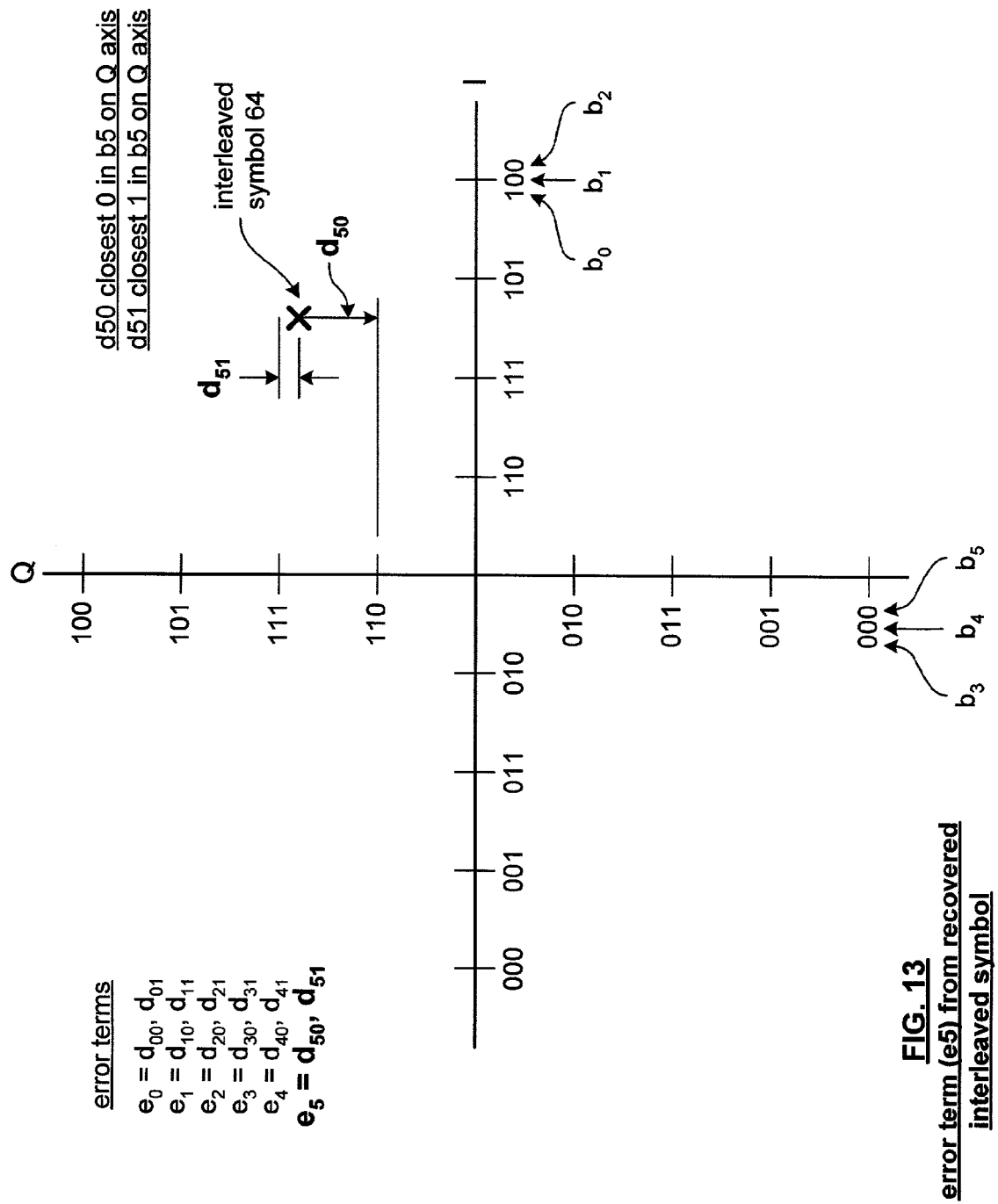

FIG. 13 illustrates an example of generating the error term $e_5$ from the recovered interleave symbol. The error term $e_5$ includes 2 values $d_{50}$ and $d_{51}$. $d_{50}$ corresponds to the closest 0 in bit position $b_5$ on the Q axis and $d_{51}$ corresponds to the closest 1 in bit position $b_5$ on the Q axis. As shown, $d_{50}$ is the physical distance between the interleave symbol 64 and position 110 along the Q axis. $d_{51}$ corresponds to the physical distance between the interleave symbol 64 and 111 on the Q axis. As graphically illustrated in FIGS. 8-13, the generation of a group of error terms by a soft slicing module 22-26 is accomplished using vertical or horizontal error distances and is done for each bin of equalized I and Q components 42.

Figure 14:
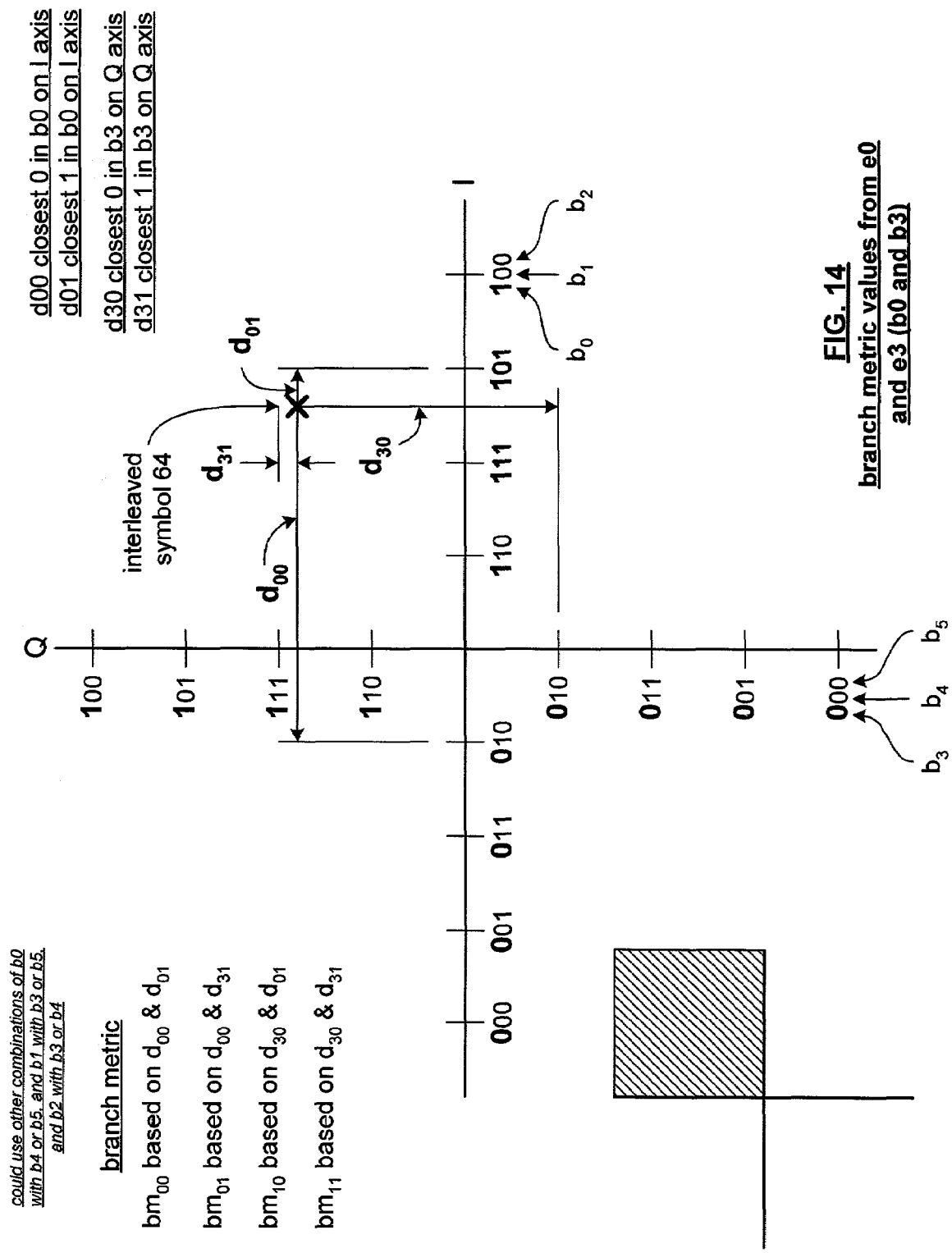
FIGS. 14-16 are graphical representations of determining branch metrics from error terms in accordance with the present invention.
Figure 15:
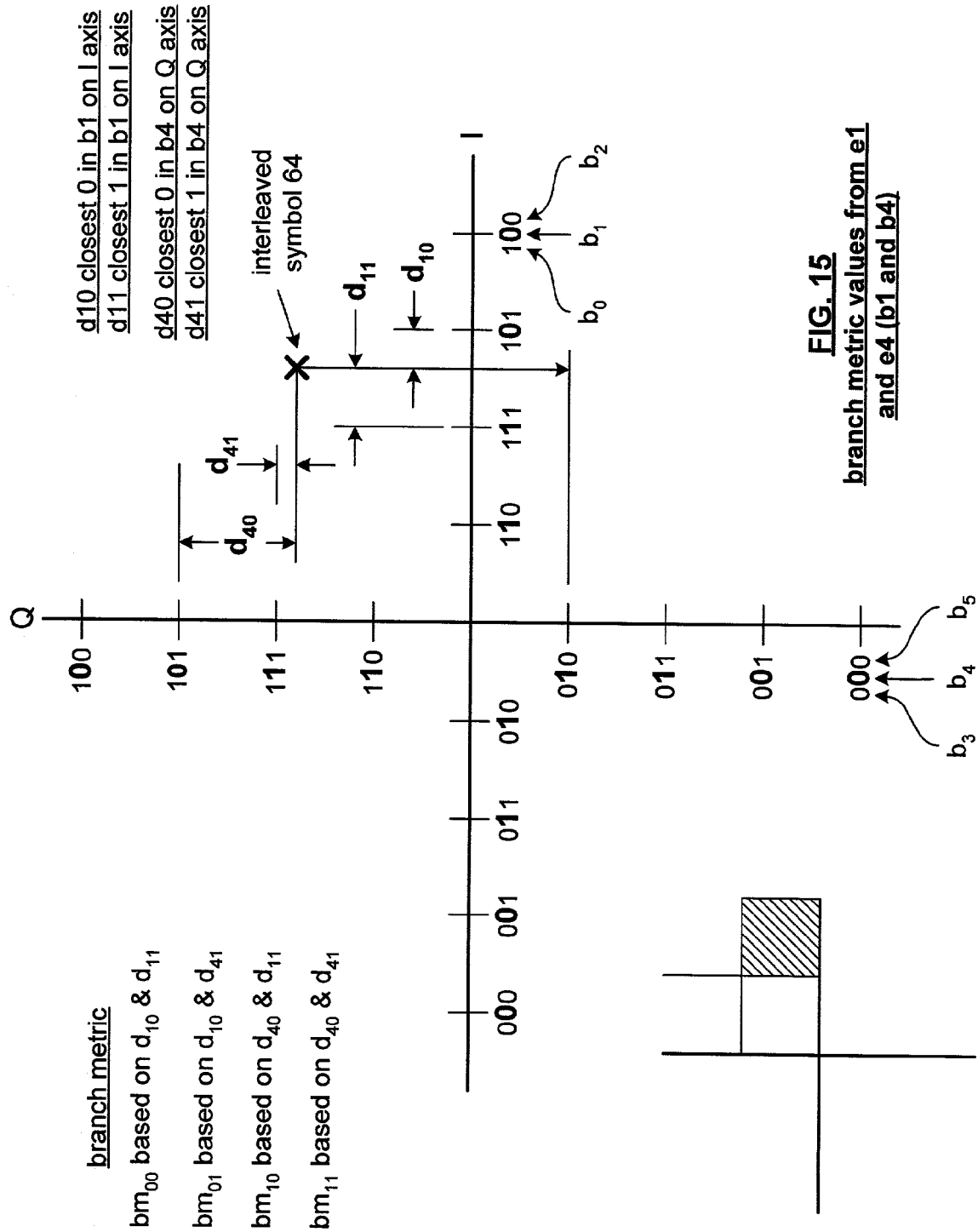
Figure 16:
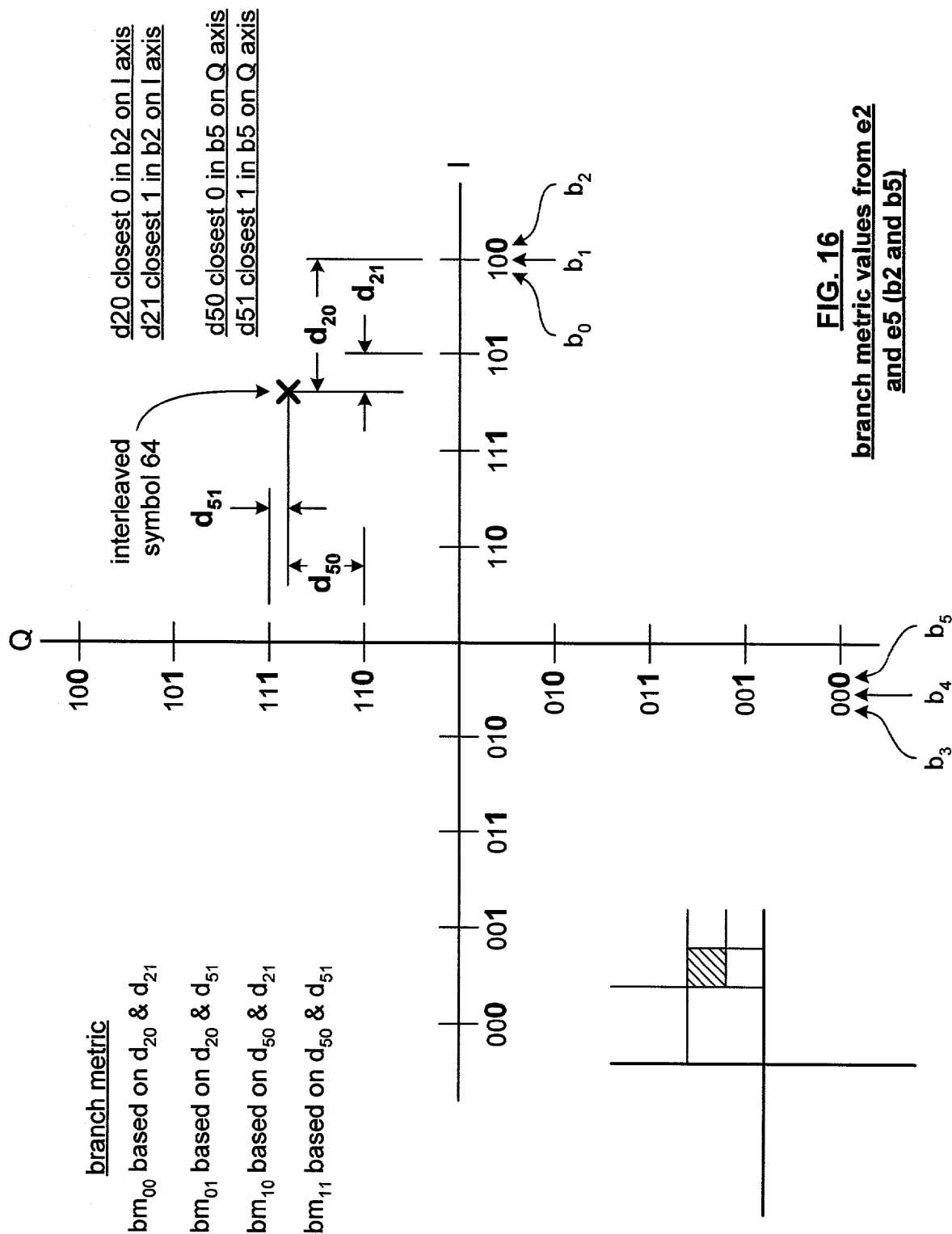

FIGS. 14-16 illustrate graphically the recapturing of data by converting the error terms into branch metrics and then reproducing the data. As shown in FIG. 14, a $1^{st}$ set of branch metrics ($bm_{00}$-$bm_{11}$) are determined based on the error term $e_0$ and error term $e_3$. In essence, the error terms correspond to the $1^{st}$ bit on the I axis and the $1^{st}$ bit along the Q axis. In general, based on the error terms $e_0$ and $e_3$, which include corresponding values $d_{00}, d_{01}, d_{30}$ and $d_{31}$, the branch metrics are determined (e.g., $bm_{00}=ABS(d_{00})+ABS(d_{01})$) and the corresponding bit 0 and bit 3 of the raw data are obtained. In essence, the error terms are used to determine for bit 0 and bit 3 which quadrant of the constellation map the interleave symbol lies. For a QPSK system, this is the only process performed to recapture the raw data. For 64 QAM, the current recovered data corresponds to 1xx 1xx where x represents indeterminant, values which will be determined as illustrated in FIGS. 15 and 16.

FIG. 15 illustrates the generation of a new set of branch metrics $bm_{00}$-$Bbm_{11}$ based on error term $e_1$ and error term $e_4$. From these error terms, branch metrics are generated to essentially position the interleave symbol 64 within one quarter of the quadrant determined by the 1st set of branch metrics described in FIG. 14. In essence, the branch metrics, based on $e_1$ and $e_4$ determine the distances with respect to ideal bit positions in bit positions b1 and b4. As such, the interleave symbol 64 is positioned within a particular quarter of this particular quadrant. For 16 QAM, the decoding would stop here, thus producing a value of 1011.

FIG. 16 illustrates the final processing for 64 QAM based on error terms $e_2$ and $e_5$. From these error terms a set of branch metrics are determined $bm_{00}$-$bm_{11}$. From these error terms, the distance represented by the branch metrics from the interleave symbol 64 to the ideal symbol positions in bit position $b_2$ and bit position $b_5$ are determined.

By producing only 6 error terms, the decoding cycle of 4 branch metrics per cycle requires only 3 cycles to recapture the raw data. In comparison with prior art soft slicing techniques and/or hard slicing techniques, many more iterations were needed since many more error terms were generated.

Figure 17:
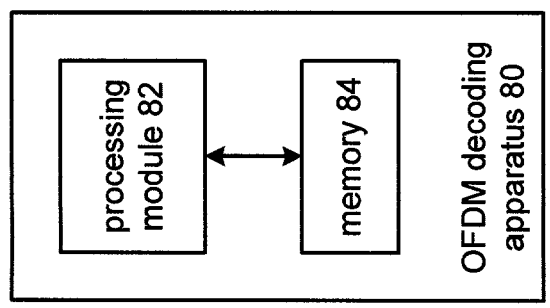
FIG. 17 is a schematic block diagram of an OFDM (orthogonal frequency division multiplex) decoding apparatus.

FIG. 17 illustrates a schematic block diagram of an OFDM decoding apparatus 80 that includes a processing module 82 and memory 84. The processing module 82 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 84 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 82 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 84 stores, and the processing module 82 executes, operational instructions corresponding to at least some of the steps and/or functions illustrated in FIG. 18.

Figure 18:
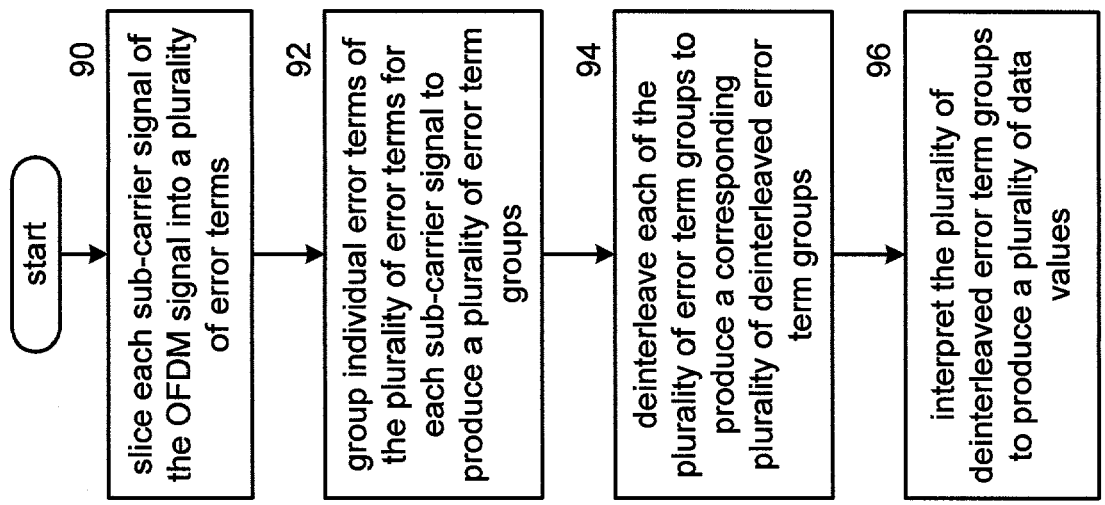
FIG. 18 is a logic diagram of a method for decoding OFDM signals in accordance with the present invention.

FIG. 18 illustrates a logic diagram of a method for decoding baseband OFDM multiplex signals. The process begins at Step 90 where each sub-carrier signal of the OFDM signal is sliced into a plurality of error terms. The particular number of error terms generated corresponds to the constellation size of the sub-carrier signal. For example, for QPSK, 2 error terms are generated, for 16 QAM, 4 error terms are generated, and for 64 QAM, 6 error terms are generated. The slicing function may also include determining a weighting factor for each of the error terms based on a signal-to-noise ratio of the corresponding sub-carrier signal. Each weighting factor is then associated with a corresponding one of the plurality of error terms. The slicing of the error terms may further include generating one-half of a group of error terms to include a closest to 0 error component and a closest to 1 error component along an I axis of a constellation map. In addition, the other half of the group of error terms may be generated to include a closest to 0 error component and a closest to 1 error component along the Q axis of the constellation map.

The process then proceeds to Step 92 where the individual error terms are grouped to produce a plurality of error term groups. As such, each error term on a particular sub-carrier is grouped into a corresponding error term group. The process then proceeds to Step 94 where each of the plurality of error term groups are de-interleaved to produce a corresponding plurality of de-interleaved error term groups. This was graphically illustrated in FIG. 7.

The process then proceeds to Step 96 where the plurality of de-interleaved error term groups are interpreted to produce a plurality of data values. Each of the plurality of data values relates to information contained in a corresponding one of the plurality of de-interleaved sub-carrier signals of the OFDM signal. If the error terms were weighted, the interpreting further includes providing greater priority to error terms having a larger weighting factor than error terms having a lessor weighting factor.

The interpreting of Step 96 may further include depuncturing the plurality of de-interleaved error term groups to produce two error terms per interval in a stream of de-punctured error terms. Such interpreting would further continue by computing a branch metric for each of the two error terms per interval and decoding the branch metrics to produce a bit of data corresponding to one of the plurality of data values. Such decoding may be done by using a one-half rate VITERBI decoding process. The depuncturing process may be performed by removing an error term from certain ones of the plurality of de-interleaved error term groups in accordance with a puncture pattern.

The preceding discussion has presented a method and apparatus for decoding baseband orthogonal frequency division multiplex signals in a radio receiver. By utilizing a soft slicing method and/or apparatus that produces a limited number of error terms for each sub-carrier signal, the decoding process is expedited while maintaining decoding accuracy. As one of average skill in the art will appreciate, other embodiments may be derived from the teaching of the present invention, without deviating from the scope of the claims.

What is claimed is:

1. A method for decoding a baseband orthogonal frequency division multiplex (OFDM) signal, the method comprises:
   slicing each sub-carrier signal of the baseband OFDM signal into a plurality of error terms, wherein a number of plurality of error terms corresponds to a constellation size of the sub-carrier signal;
   grouping individual error terms of the plurality of error terms for each sub-carrier signal to produce a plurality of error term groups;
   deinterleaving each of the plurality of error term groups to produce a corresponding plurality of deinterleaved error term groups; and
   interpreting the plurality of deinterleaved error term groups to produce a plurality of data values, wherein each data value of the plurality of data values relates to information contained in a corresponding one of a plurality of deinterleaved sub-carrier signals of the baseband OFDM signal.

2. The method of claim 1, wherein the slicing each sub-carrier signal into a plurality of error terms further comprises:
   slicing each sub-carrier signal into six error terms for 64-Quadrature Amplitude modulation (QAM);
   slicing each sub-carrier signal into four error terms for 16-QAM; and
   slicing each sub-carrier signal into two error terms for 4-QAM.

3. The method of claim 1, wherein the slicing each sub-carrier signal further comprises:

determining a weighting factor for each of the plurality of error terms based on a signal-to-noise ratio of the sub-carrier signal to produce a plurality of weighting factors; and associating each of the plurality of weighting factors with a corresponding one of the plurality of error terms.

4. The method of claim 3, wherein the interpreting of the deinterleaved error term groups further comprises:

providing greater priority to error terms of the deinterleaved error tern groups that have a corresponding weighting factor of the plurality of weighting factors that is greater than the corresponding weighting factor of the plurality of weighting factors of other error terms of the deinterleaved error term groups to produce higher priority error terms and lower priority error terms; and interpreting the higher priority error terms and lower priority error terms to produce the plurality of data values.

5. The method of claim 1, wherein the slicing each sub-carrier signal into a plurality of error terms further comprises:

generating each error term of one-half of the plurality of error terms to have a closest-zero error component and a closest-one error component along an I axis of a constellation map; and generating each error term of another-half of the plurality of error terms to have a closest-zero error component and a closest-one error component along a Q axis of the constellation map.

6. The method of claim 1, wherein the interpreting the plurality of deinterleaved error term groups farther comprises:

depuncturing the plurality of deinterleaved error term groups to produce two error terms per interval in a stream of depunctured error terms;

computing a branch metric for each of the two error terms per interval; and decoding the branch metric to produce a bit of a data value of one of the plurality of data values.

7. The method of claim 6, wherein the decoding farther comprises:

utilizing a one-half rate Viterbi decoding process.

8. An apparatus for decoding a baseband orthogonal frequency division multiplex (OFDM) signal, the apparatus comprises:

a processing module; and a memory operably coupled to the processing module, wherein the memory includes operational instructions that cause the processing module to:

slice each sub-carrier signal of the baseband OFDM signal into a plurality of error terms, wherein a number of the plurality of error terms corresponds to a constellation size of the sub-carrier signal;

group individual error terms of the plurality of error terms for each sub-carrier signal to produce a plurality of error term groups;

deinterleave each of the plurality of error term groups to produce a corresponding plurality of deinterleaved error term groups; and interpret the plurality of deinterleaved error term groups to produce a plurality of data values, wherein each of the plurality of data values relates to information contained in a corresponding one of a plurality of deinterleaved sub-carrier signals of the baseband OFDM signal.

9. The apparatus of claim 8, wherein the memory further comprises operational instructions that causes the processing module to slice each sub-carrier signal into a plurality of error terms by:

slicing each sub-carrier signal into six error terms for 64-Quadrature Amplitude modulation (QAM);

slicing each sub-carrier signal into four error terms for 16-QAM; and slicing each sub-carrier signal into two error terms for 4-QAM.

10. The apparatus of claim 8, wherein the memory further comprises operational instructions that causes the processing module to slice each sub-carrier signal into a plurality of error terms by:

determining a weighting factor for each of the plurality of error terms based on a signal-to-noise ratio of the sub-carrier signal to produce a plurality of weighting factors; and associating each of the plurality of weighting factors with a corresponding one of the plurality of error terms.

11. The apparatus of claim 10, wherein the memory further comprises operational instructions that causes the processing module to interpret the deinterleaved error term groups by:

providing greater priority to error terms of the deinterleaved error term groups that have a corresponding weighting factor of the plurality of weighting factors that is greater than the corresponding weighting factor of the plurality of weighting factors of other error terms of the deinterleaved error term groups to produce higher priority error terms and lower priority error terms; and interpreting the higher priority error terms and lower priority error terms to produce the plurality of data values.

12. The apparatus of claim 8, wherein the memory further comprises operational instructions that causes the processing module to slice each sub-carrier signal into a plurality of error terms by:

generating each error term of one-half of the plurality of error terms to have a closest-zero error component and a closest-one error component along an I axis of a constellation map; and generating each error term of another-half of the plurality of error terms to have a closest-zero error component and a closest-one error component along a Q axis of the constellation map.

13. The apparatus of claim 8, wherein the memory further comprises operational instructions that causes the processing module to interpret the plurality of deinterleaved error term groups by:

depuncturing the plurality of deinterleaved error term groups to produce two error terms per interval in a stream of depunctured error terms;

computing a branch metric for each of the two error terms per interval; and decoding the branch metric to produce a bit of a data value of one of the plurality of data values.

14. The apparatus of claim 8, wherein the memory further comprises operational instructions that causes the processing module to decode by:

utilizing a one-half rate Viterbi decoding process.

15. A radio receiver comprises:

a low noise amplifier operably coupled to receive and amplify a orthogonal frequency division multiplex (OFDM) signal to produce an amplified OFDM signal;

a mixing module operably coupled to receive and mix the amplified OFDM signal with a local oscillation to produce a baseband signal;

an analog-to-digital conversion module operably coupled to receive and convert the baseband signal into a digital baseband signal;

a fast Fourier transform module operably coupled to receive and convert the digital baseband signal into a plurality of bins of I components and Q components;

a frequency equalizing module operably coupled to receive and equalize a frequency response of the plurality of bins of I components and Q components to produce a plurality of bins of equalized I components and equalized Q components;

a plurality of soft slicing modules operably coupled to receive the plurality of bins of equalized I components and equalized Q components and to produce a plurality of error term groups therefrom, wherein each of the plurality of error term groups is produced from a corresponding one of the plurality of bins of the equalized I components and equalized Q components;

a deinterleaving module operably coupled to receive and deinterleave the plurality of error term groups to produce a plurality of deinterleaved error term groups therefrom; and a decoding module operably coupled to receive and decode the plurality of deinterleaved error term groups to produce a plurality of data values.

16. The radio receiver of claim 15 wherein:

each of the plurality of soft slicing modules produces six error terms for each of the plurality of bins for 64-Quadrature Amplitude modulation (QAM);

each of the plurality of soft slicing modules produces four error terms for each of the plurality of bins for 16-QAM; and each of the plurality of soft slicing modules produces two error terms for each of the plurality of bins for 4-QAM.

17. The radio receiver of claim 15 wherein:

each of the plurality of soft slicing modules determines a weighting factor for each of the plurality of error terms based on a signal-to-noise ratio of the corresponding one of the plurality of bins to produce a plurality of weighting factors; and each of the plurality of soft slicing modules associates each of the plurality of weighting factors with a corresponding one of the plurality of error terms.

18. The radio receiver of claim 17 wherein:

the deinterleaving module provides greater priority to error terms of the plurality if deinterleaved error term groups that have a corresponding weighting factor of the plurality of weighting factors that is greater than the corresponding weighting factor of the plurality of weighting factors of other error terms of the plurality of deinterleaved error term groups to produce higher priority error terms and lower priority error terms; and the decoding module interprets the higher priority error terms and lower priority error terms to produce the plurality of data values.

19. The radio receiver of claim 15 wherein:

each of the plurality of soft slicing modules generates each error term of one-half of the plurality of error terms to have a closest-to-zero error component and a closest-to-one error component along an I axis of a constellation map; and each of the plurality of soft slicing modules generates each error term of another-half of the plurality of error terms to have a closest-to-zero error component and a closest-to-one error component along a Q axis of the constellation map.

20. The radio receiver of claim 15 wherein:

the decoding module includes a depuncturing module operably coupled to depuncture the plurality of deinterleaved error term groups to produce two error terms per interval in a stream of depunctured error terms;

the decoding module computes a branch metric for each of the two error terms per interval; and the decoding module decodes the branch metric to produce a bit of a data value of one of the plurality of data values.

21. The radio receiver of claim 20, wherein the decoding module further comprises:

a one-half rate Viterbi decoding module.

* * * * *